United States Patent [19]
Fair

[11] 3,895,842
[45] July 22, 1975

[54] AUXILIARY SNOW BODY

[76] Inventor: Walter R. Fair, Menno, S. Dak. 57045

[22] Filed: July 30, 1974

[21] Appl. No.: 493,096

[52] U.S. Cl. .............................. 298/1 R; 296/35 A
[51] Int. Cl. .............................................. B60p 1/00
[58] Field of Search ........ 298/1 R, 23 A, 1 A, 23 F, 298/8 R, 23 D, 23 DF; 296/35 A, 1 R, 10, 28 K; 214/501, 502, 515, 372; 105/261 R, 261 A

[56] References Cited
UNITED STATES PATENTS

| | | | |
|---|---|---|---|
| 1,566,540 | 12/1925 | Ketcham | 298/8 R |
| 2,264,216 | 11/1941 | Milligan | 214/501 |
| 2,881,024 | 4/1959 | Saiberlich | 298/1 A X |
| 3,107,020 | 10/1963 | Dempster et al. | 296/35 A X |
| 3,181,909 | 5/1965 | Wise | 296/10 |

Primary Examiner—Frank E. Werner
Attorney, Agent, or Firm—John W. Adams

[57] ABSTRACT

This is an auxiliary snow body for dump trucks which is specifically constructed to be quickly and easily mounted in the conventional dump body of a gravel truck to increase the load carrying volume thereof and convert the same from a gravel carrier to an efficient snow carrier. The snow body embodies an improved floor construction which includes longitudinally disposed, spaced apart runners which support the relatively light weight metal of the floor to provide spaced ridges with intermediate dished portions designed to reduce the drag of the snow as it is being dumped and the snow box is also provided with an automatic cable operated tailgate release mechanism which is opened by a cable and lever arrangement actuated when the dump body is initially raised.

9 Claims, 6 Drawing Figures

PATENTED JUL 22 1975 3,895,842

AUXILIARY SNOW BODY

It is an object of this invention to provide an enlarged insert body unit adapted to be mounted within the dump body of a conventional dump truck to increase the load carrying capacity thereof for moving relatively large volumes of light weight material such as snow and the like.

It is another object to provide enlarged insert body unit specifically constructed to permit easy mounting and removal thereof with respect to a conventional dump truck body.

It is still a further object to provide such a body unit provided with a load carrying floor construction specifically designed to reduce the frictional resistance of the snow thus facilitating the dumping operation.

It is still a further object to provide a dump body insert unit having a cable operated tailgate releasing and pivoting mechanism which is automatically actuated when the dump body is initially raised into dumping position.

These and other objects and advantages of the invention will more fully appear in the following description made in connection with the accompanying drawings wherein like reference characters refer to the same or similar parts throughout the several views and in which.

Figure 5:
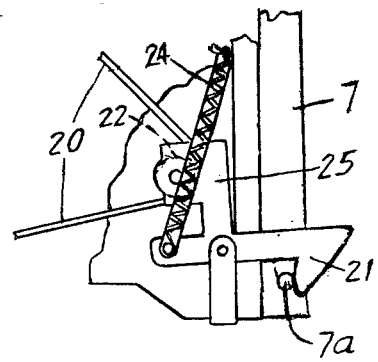
FIG. 5 is an enlarged elevational fragmentary elevational view showing the tailgate latch mechanism.

A gravel truck 4 having a conventional dump body 3 is illustrated. The snow body illustrated in the drawings is designated as an entirety by the numeral 6 and is equipped with an automatically actuated tailgate 7 which will be described in detail subsequently herein. The conventional tailgate of the truck body 3 normally mounted on pivot pins 5 of said body is initially removed to permit the snow body 6 to be received therein. A pair of strut elements 32 attach to the outwardly flared top and upper sides of the insert 6 extending to the ground supporting the insert 6 and allowing storage of said insert at an angle of approximately 45° which facilitate the easy loading of said insert 6 into the dump body of the truck 3 when the truck is backed thereunder. The strut elements 32 are outwardly spread widely enough to allow the dump body 3 and wheels adequate clearance to approach in a dump mounting position similar to the angle of the insert. This mounting procedure is shown in FIG. 5 and involves merely backing under the elevated end of the insert 6. Thus the variances in usuage necessary to such a combination system are subserved by the easily mounted insert and its angular storage capability.

Figure 3:
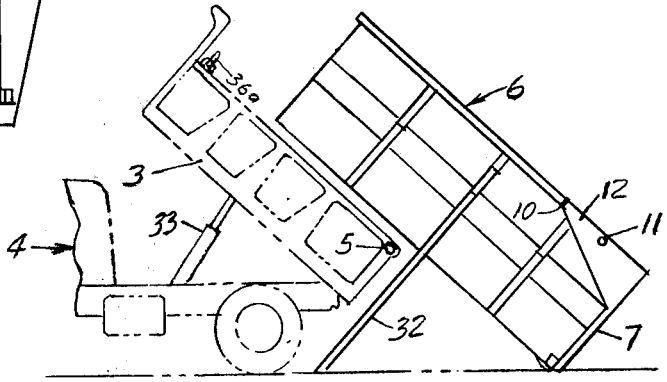
FIG. 3 is a side elevational view showing the insert body unit in a typical storage position and illustrating a conventional dump truck in position to receive the body unit for increasing the load carrying capacity thereof.
Figure 6:
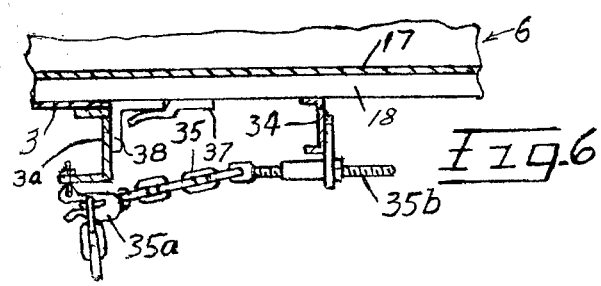
FIG. 6 is a fragmentary side elevational view drawn to a somewhat larger scale and showing the rear attachment means for the dump body insert.

The cross member 34 is fixed at the bottom of the snow body and provides an anchor for the rear ends of a pair of anchor chains 35. A pair of hooks 35a are connected to the rear channel member of the 3a of the truck body 3 as best shown in FIG. 3. A pair of take up bolts 35b are connected to the forward ends of the chains 35 and respectively connect the same to the cross member 34, also as shown in FIG. 3.

Figure 1:
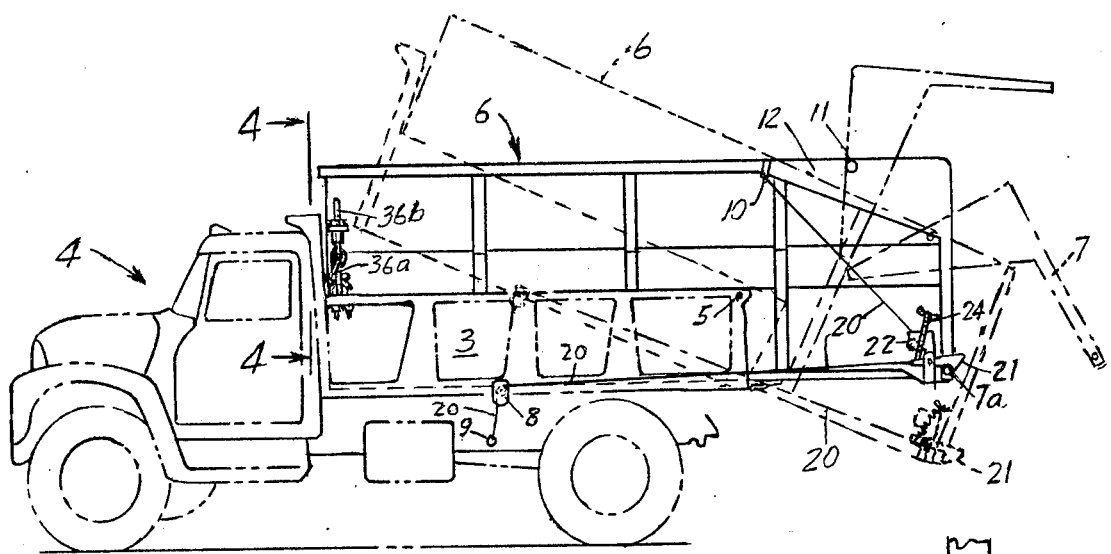
FIG. 1 is a side elevational view showing a conventional dump truck with my enlarged insert body unit mounted therein.
Figure 2:
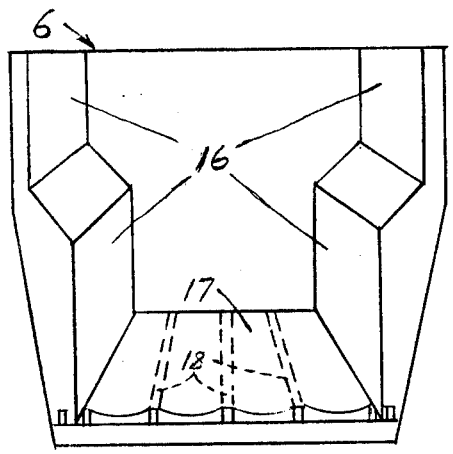
FIG. 2 is a rear perspective view showing the insert body unit with the tailgate removed.
Figure 4:
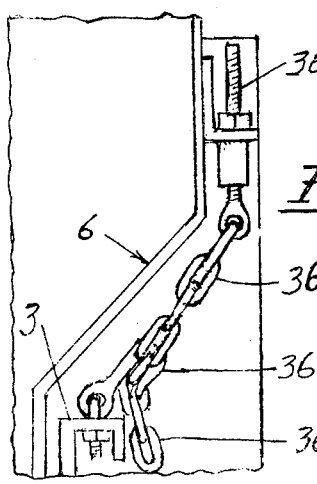
FIG. 4 is a fragmentary sectional view taken substantially along the line 4—4 of FIG. 1 and showing the forward means for attaching the enlarged insert body unit to the dump truck body.

A pair of front anchor chains 36 are provided and have a pair of hooks 36a connected to the dump truck body as best shown in FIG. 4 and a pair of take up bolts 36b connected to the forward side portions of the snow body insert unit 6 as best shown in FIGS. 1 and 4. A cleat member 37 is fixed across the bottom of the snow body runners at a location to receive and mate with a rearwardly extending flange of an angle member 38 as best shown in FIG. 3, thus providing a positive hold down for the rear portion of the snow body.

The bottom 17 of the snow body 6 is formed from relatively light guage metal and has a plurality of longitudinally disposed runners 18 which engage the floor of the dump body 3 and support the bottom 17 of the snow body in elevated position thereabove. The light guage metal is designed to yield under the weight of the snow load to form a series of concavely curved panels disposed between the spaced runners 18. The snow body is, of course, substantially higher, wider and longer than the conventional gravel body 3 and is provided with sides 16 which extend upwardly and outwardly from the floor 17.

The tailgate 7 of the snow body has a pair of forwardly extending lever arms 12 fixed at their centers to the upper portions thereof. The level arms are respectively pivoted on a pair of pivot pins 11 mounted on the upper portions of the sides 16. A pair of cables 20 are respectively connected at one end to the forward ends of said arms 12 as indicated at 10 and at their other ends to the frame of the truck 4 as indicated at 9. A pair of guiding sheaves 8 and 22 are provided for each cable 20 on the respective sides of the truck to guide the cable during the dumping operation and actuation of the tailgate. A latch member 21 is pivotally mounted at rear bottom end of each side panel 16 of the snow body and a spring 24 normally urges the same into locked engagement with the latch pins 7a fixed to the bottom corners of the tailgate 7. A bell crank arm 25 is fixed in upstanding relation to the latch member 21 and has the sheave 22 mounted on the upper portion thereof so that when the cable 20 is tensioned by elevating the hoist mechanism 33 of the dump body both of the latches 21 will be released on the side of the tailgate 7 and the cable will swing the tailgate up into the dotted position shown in FIGS. 1 and 4. When the dump body is lowered the tailgate will swing down and the latches 21 will re-engage with the pins 7a and hold the same in closed position until the next dumping operation.

It will be seen that this invention provides an easily attachable and removable enlarged insert body unit for conventional dump trucks which will increase very substantially the load carrying capacity thereof for carrying light weight materials such as snow and the like. The enlarged body unit is provided with a floor construction which is specifically designed to minimize the frictional drag of the snow when the same is being dumped and is also provided with a cable operated automatically actuated tailgate mechanism for swinging the tailgate up into open position whenever the dump body is raised.

It will, of course, be understood that various changes may be made in the form, details, arrangement and proportions of the parts without departing from the scope of this invention as set forth in the appended claims.

What is claimed is:

1. In a dump truck having a load carrying dump body having a bottom and sides and including a mechanism for dumping the same, an enlarged insert body unit adapted to be mounted within the dump body to increase the load carrying capacity thereof for use in moving relatively large volumes of snow and other light weight materials, said insert unit comprising, a smooth-surfaced bottom panel substantially longer than the dump truck body and slightly narrower than the inside width of said truck body to be received therewithin and extend rearwardly therebeyond, a pair of upstanding sides connected at their lower edges to said insert bottom and extending a substantial distance above the sides of the dump truck body, means for rigidly connecting the front ends of said insert sides, a tail gate connecting at rear ends of said sides and normally retaining the load within said body insert but being hinged to permit the load to be dumped when the truck dumping mechanism is actuated, and means for removably attaching the insert unit to the dump body of the truck to positively anchor the same therein when in use but permitting the insert unit to be removed from the dump body when heavier loads are to be carried by the truck.

2. The structure set forth in claim 1 wherein the longitudinal sides of said insert unit are flared outwardly at the top of the dump body sides to extend upwardly and outwardly therebeyond to increase the load-carrying capacity of the insert.

3. The structure set forth in claim 2 wherein a pair of supporting struts adapted to be mounted under the flared out sides of the insert unit to support the same in a predetermined inclined position when removed from the dump truck and facilitate mounting the insert in the truck body by backing the inclined truck body under the insert unit.

4. The structure set forth in claim 1 wherein a plurality of longitudinally extending laterally spaced bottom runners are provided for engaging the bottom of the dump truck body to facilitate mounting thereon and removal therefrom and to support the smooth bottom panel of the insert unit to permit light gauge metal to be used for said bottom which will depress between said runners and produce longitudinal ridges in the inside bottom surface thus reducing the frictional resistance between the snow and said bottom surface and facilitate dumping the snow therefrom.

5. The structure as set forth in claim 1 wherein a frontal chain connecting system is provided at the front of the dump body and also at the front of said insert, said system consisting of a bolt receiving element connected to the insert unit, a bolt received in said element and a chain attached to the bolt and extending therefrom to a hook element attached to the front of the dump body to facilitate removable easy connection between the insert unit and the truck body.

6. The structure set forth in claim 5 wherein a rear chain connector system comprising means for connecting the rear portion of the dump body to an intermediate portion of the insert unit.

7. The structure set forth in claim 1, and a tailgate having forwardly extending pivot arms fixed to the upper side portions thereof and pivotally connected to the upper edges of the sides of said insert unit, and cable means connected with said arms in a manner to swing the tailgate up into open position when the truck body is dumped.

8. The structure set forth in claim 7 and a releasable latch mechanism normally holding the tailgate in closed position across the back end of the insert unit but connected to said cable means to initially release when the truck body is initially raised into dumping position.

9. The structure set forth in claim 1 and said removable attachment means including a cleat element fixed to the underside of the insert bottom, and a mating flange element fixed to the rear of the dump body of the truck and mating with said cleat element when the insert body unit is connected to the dump body to positively hold down the rear end of said insert body unit.

* * * * *